United States Patent
Tung et al.

(10) Patent No.: US 9,722,914 B2
(45) Date of Patent: Aug. 1, 2017

(54) HETEROGENEOUS NETWORK SYSTEM, NETWORK APPARATUS, AND RENDEZVOUS PATH SELECTION METHOD THEREOF

(71) Applicant: Institute For Information Industry, Taipei (TW)

(72) Inventors: Yi-Chih Tung, Taipei (TW); Pang-Fu Liu, New Taipei (TW); Wen-Jyi Hwang, Taipei (TW); Chih-Hsiang Ho, Taipei (TW)

(73) Assignee: Institute For Information Industry, Taipei (TW)

( * ) Notice: Subject to any disclaimer, the term of this patent is extended or adjusted under 35 U.S.C. 154(b) by 123 days.

(21) Appl. No.: 14/723,659

(22) Filed: May 28, 2015

(65) Prior Publication Data
US 2016/0323177 A1 Nov. 3, 2016

(30) Foreign Application Priority Data
Apr. 29, 2015 (TW) .............................. 104113673 A

(51) Int. Cl.
*H04L 12/26* (2006.01)
*H04L 12/721* (2013.01)
(Continued)

(52) U.S. Cl.
CPC .......... *H04L 45/124* (2013.01); *H04L 12/413* (2013.01); *H04L 43/08* (2013.01);
(Continued)

(58) Field of Classification Search
None
See application file for complete search history.

(56) References Cited

U.S. PATENT DOCUMENTS

| 7,349,427 B1 * | 3/2008 | Canning ............. H04L 12/4633 370/400 |
| 7,492,717 B2 * | 2/2009 | Mosko ................ H04L 12/2602 370/238 |

(Continued)

FOREIGN PATENT DOCUMENTS

| CN | 101103597 A | 1/2008 |
| CN | 103686946 A | 3/2014 |
| TW | 200711425 A | 3/2007 |

OTHER PUBLICATIONS

Office Action to the corresponding Taiwan Patent Application rendered by the Taiwan Intellectual Property Office (TIPO) on May 10, 2016, 9 pages (including English translation).

*Primary Examiner* — Alpus H Hsu
(74) *Attorney, Agent, or Firm* — Skaar Ulbrich Macari, P.A.

(57) ABSTRACT

A heterogeneous network system, network apparatus, and rendezvous path selection method thereof are provided. The heterogeneous network system includes partner network apparatuses and a network apparatus. The transceiving interfaces of the network apparatus and the partner network apparatuses are not all the same. The network apparatus measures at least one first transmission parameter and receives a plurality of second transmission parameters. Each of the at least one first transmission parameter is associated with transmission from the network apparatus to one of its neighboring network apparatuses. Each of the second transmission parameters is associated with transmission between two network apparatuses neighboring each other. The network apparatus enumerates a plurality of paths from itself to a target network apparatus and calculates a path cost for each of the paths according to at least a portion of a combination of the at least one first transmission parameter and the second transmission parameters.

15 Claims, 6 Drawing Sheets

(51) Int. Cl.
*H04L 12/911* (2013.01)
*H04L 12/927* (2013.01)
*G01R 31/08* (2006.01)
*H04L 12/413* (2006.01)

(52) U.S. Cl.
CPC .......... *H04L 47/805* (2013.01); *H04L 47/822* (2013.01); *H04L 43/0864* (2013.01); *H04L 43/0894* (2013.01)

(56) References Cited

U.S. PATENT DOCUMENTS

| | | | |
|---|---|---|---|
| 7,672,273 B2 | 3/2010 | Ho et al. | |
| 7,701,857 B2* | 4/2010 | Hikspoors | H04L 45/10 370/238 |
| 8,068,411 B2* | 11/2011 | Vasseur | H04L 45/02 370/217 |
| 8,139,587 B2 | 3/2012 | Larsson et al. | |
| 8,442,030 B2* | 5/2013 | Dennison | H04L 12/4625 370/217 |
| 8,531,969 B2* | 9/2013 | Ong | H04L 45/42 370/238 |
| 9,137,162 B2* | 9/2015 | Drobinsky | H04L 47/12 |
| 2001/0047423 A1* | 11/2001 | Shao | H04L 12/5693 709/235 |
| 2002/0080755 A1* | 6/2002 | Tasman | H04L 12/1854 370/338 |
| 2003/0120804 A1* | 6/2003 | Houston | H04L 45/00 709/238 |
| 2003/0126284 A1* | 7/2003 | Houston | H04L 12/4633 709/238 |
| 2007/0025246 A1 | 2/2007 | Pirzada et al. | |

* cited by examiner

| Second transmission parameters | First network apparatus | Second network apparatus |
|---|---|---|
| Associated with a transmission from the network apparatus B to the network apparatus A | Network apparatus B | Network apparatus A |
| Associated with a transmission from the network apparatus B to the network apparatus C | Network apparatus B | Network apparatus C |
| Associated with a transmission from the network apparatus B to the network apparatus D | Network apparatus B | Network apparatus D |
| Associated with a transmission from the network apparatus C to the network apparatus A | Network apparatus C | Network apparatus A |
| Associated with a transmission from the network apparatus C to the network apparatus B | Network apparatus C | Network apparatus B |
| Associated with a transmission from the network apparatus C to the network apparatus D | Network apparatus C | Network apparatus D |
| Associated with a transmission from the network apparatus D to the network apparatus B | Network apparatus D | Network apparatus B |
| Associated with a transmission from the network apparatus D to the network apparatus C | Network apparatus D | Network apparatus C |

FIG. 1C

| Round trip time (RTT) | Available bandwidth | QoS parameter |
|---|---|---|
| 1 (0~9 ms) | 8 (0~124 Mbps) | 8 (0) |
| 2 (10~19 ms) | 7 (125~249 Mbps) | 7 (1) |
| 3 (20~29 ms) | 6 (250~374 Mbps) | 6 (2) |
| 4 (30~39 ms) | 5 (375~499 Mbps) | 5 (3) |
| 5 (40~49 ms) | 4 (500~624 Mbps) | 4 (4) |
| 6 (50~59 ms) | 3 (625~749 Mbps) | 3 (5) |
| 7 (60~69 ms) | 2 (750~874 Mbps) | 2 (6) |
| 8 (70~79 ms) | 1 (875~999 Mbps) | 1 (7) |

| Paths | Round trip time (RTT) (weight value=5) | Available bandwidth (weight value=4) | QoS parameter (weight value=1) | Path costs |
|---|---|---|---|---|
| A→C | 3 (25 ms) | 4 (500) | 6 (2) | 37 |
| A→B→C | 1 (0.9 ms+3.2 ms=4.1 ms) | 6 (min(310, 360)) | 1 (min(7, 7)) | 30 |
| A→B→D→C | 3 (0.9 ms+25 ms+3 ms=28.9 ms) | 8 (min(310, 100, 300)) | 6 (min(7, 5, 2)) | 53 |

FIG. 1F

HETEROGENEOUS NETWORK SYSTEM, NETWORK APPARATUS, AND RENDEZVOUS PATH SELECTION METHOD THEREOF

PRIORITY

This application claims priority to Taiwan Patent Application No. 104113673 filed on Apr. 29, 2015, which is hereby incorporated by reference in its entirety.

FIELD

The present invention relates to a heterogeneous network system, a network apparatus, and a rendezvous path selection method thereof. In particular, the heterogeneous network system, the network apparatus, and the rendezvous path selection method thereof according to the present invention select a transmission path according to local and global transmission parameters.

BACKGROUND

As a result of the advancement of network technologies, network systems of various types and scales have been developed. Small-scale heterogeneous network systems (e.g., home network systems) are just one kind of network system that have experienced rapid development over recent years. A small-scale heterogeneous network system comprises a limited number of network apparatuses, but often comprises various different kinds of network apparatuses (e.g., set top boxes, smart TVs, tablet computers, smartphones, digital video players and notebook computers). Network communication standards supported by these network apparatuses are not all the same (i.e., the interface types of the transceiving interfaces of these network apparatuses are not all the same). For example, it is possible that in a small-scale heterogeneous network system, some of the network apparatuses have Power Line Communication (PLC) interfaces and Wi-Fi interfaces while other network apparatuses have Ethernet interfaces and Multimedia over Coax Alliance (MoCA) interfaces. Currently, protocols for integrating such different interfaces have been available (e.g., the IEEE 1905.1 Standard, the IEEE 1905.1a Standard and the ITU-T G.hn protocol), but these protocols can collect transmission information of interface types of the transceiving interfaces in lower layers.

Path selection (i.e., how to select the most appropriate path when a network apparatus performs transmission with another network apparatus) is the most common topic in various network systems. For homogeneous network systems (i.e., all network apparatuses of which support the same network communication standard, e.g., the Ethernet or network system formed by optical fibers), some path selection technologies have been available. In a homogeneous network system, a network apparatus can select a possible transmission path in a greedy mechanism through a next hop according to related communication protocols such as routing or bridging. These mechanisms may be classified into either the distance vector algorithm or the link state algorithm. Details of the distance vector algorithm and the link state algorithm shall be well known to those of ordinary skill in the art, so no further description will be made herein.

Although the two kinds of path selection mechanisms (i.e., the distance vector algorithm and the link state algorithm) have been available currently, it is difficult to apply these algorithms to heterogeneous network systems. The main reason is that network communication standards supported by network apparatuses in the heterogeneous network system are not all the same, so the dynamic link relationships are relatively complex. Each time there is a network apparatus joining in and/or leaving the heterogeneous network system, the topology and the link relationships of the heterogeneous network system change significantly. If the distance vector algorithm or the link state algorithm is adopted directly for path selection in the heterogeneous network system, it is often impossible to get the most appropriate path (i.e., the path with the lowest cost).

Accordingly, it is important to provide an efficient path selection mechanism for network apparatuses in a heterogeneous network system.

SUMMARY

Disclosed is a network apparatus for use in a heterogeneous network system. The heterogeneous network system comprises the network apparatus and a plurality of partner network apparatuses. The network apparatus comprises at least one transceiving interface and a processor that are electrically connected with each other. Each of the partner network apparatuses comprises at least one partner transceiving interface. Each of the at least one transceiving interface and the at least one partner transceiving interface has an interface type, wherein the interface types are not all the same. Each of the at least one transceiving interface is directly connected to at least one neighboring network apparatus, wherein each of the at least one neighboring network apparatus is one of the partner network apparatuses. Each of the at least one transceiving interface measures at least one first transmission parameter, wherein each of the at least one first transmission parameter is associated with transmission from one of the at least one transceiving interface to one of the at least one neighboring network apparatus. Each of the at least one transceiving interface receives a plurality of second transmission parameters, wherein each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus. The processor is configured to enumerate a plurality of paths from the network apparatus to a target network apparatus, wherein the target network apparatus is one of the partner network apparatuses. The processor calculates a path cost for each of the paths according to at least a portion of a combination of the at least one first transmission parameter and the second transmission parameters.

Also disclosed is a rendezvous path selection method for a network apparatus. A heterogeneous network system comprises the network apparatus and a plurality of partner network apparatuses. The network apparatus is directly connected to at least one neighboring network apparatus, wherein each of the at least one neighboring network apparatus is one of the partner network apparatuses. The rendezvous path selection method comprises the following steps of: (a) measuring at least one first transmission parameter, wherein each of the at least one first transmission parameter is associated with transmission from the network apparatus to one of the at least one neighboring network apparatus, (b) receiving a plurality of second transmission parameters, wherein each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus, (c) enumerating a plurality of paths from the network apparatus to a target network apparatus, wherein the target network apparatus is one of the partner network apparatuses, and (d) calculating a path cost for each of the paths according to at least a portion of a combination of the at least one first transmission parameter and the second transmission parameters. Each of the network apparatus and the partner network apparatuses comprises a transceiving interface, each of the transceiving interfaces has an interface type, and the interface types are not all the same.

Further disclosed is a heterogeneous network system. The heterogeneous network system comprises a plurality of partner network apparatuses and a network apparatus. The network apparatus is directly connected to at least one neighboring network apparatus, wherein each of the at least one neighboring network apparatus is one of the partner network apparatuses. The network apparatus measures at least one first transmission parameter, wherein each of the at least one first transmission parameter is associated with transmission from one of the at least one transceiving interface of the network apparatus to one of the at least one neighboring network apparatus. The network apparatus receives a plurality of second transmission parameters, wherein each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus. The network apparatus is further configured to enumerate a plurality of paths from the network apparatus to a target network apparatus, wherein the target network apparatus is one of the partner network apparatuses. The network apparatus further calculates a path cost for each of the paths according to at least a portion of a combination of the at least one first transmission parameter and the second transmission parameters.

Each transceiving interface of each network apparatus comprised in the heterogeneous network system measures a transmission parameter between itself and the neighboring network apparatus, transmits the measured transmission parameter, and receives the transmission parameters transmitted by other network apparatuses. Through the aforementioned operations, each of the network apparatuses obtains not only local transmission data (i.e., the transmission parameters between the transceiving interface thereof and the neighboring network apparatuses) but also global transmission data (i.e., the transmission parameters between the transceiving interfaces of other network apparatuses). Since each of the network apparatuses can calculate a path cost for each of the paths according to the local transmission data and the global transmission data, accurate path costs can be calculated to select the most appropriate transmission path. The transmission parameters used in the present invention may comprise a plurality of sub-parameters, wherein each of the sub-parameters may correspond to a weight value in calculation of the path cost. Therefore, a higher network utilization ratio can be achieved by selecting desired sub-parameters and adjusting the corresponding weight values.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1C depicts a plurality of second transmission parameters received by the network apparatus A;

FIG. 1F depicts the path cost of each of the paths from the network apparatus A to the network apparatus C;

DETAILED DESCRIPTION

In the following description, the heterogeneous network system, the network apparatus, and the rendezvous path selection method thereof will be explained with reference to example embodiments thereof. However, these example embodiments are not intended to limit the present invention to any specific examples, embodiments, environment, applications, or particular implementations described in these embodiments. Therefore, the description of these example embodiments is only for purpose of illustration rather than to limit the present invention. It should be appreciated that in the following example embodiments and the attached drawings, elements unrelated to the present invention are omitted from depiction.

Figure 1A:
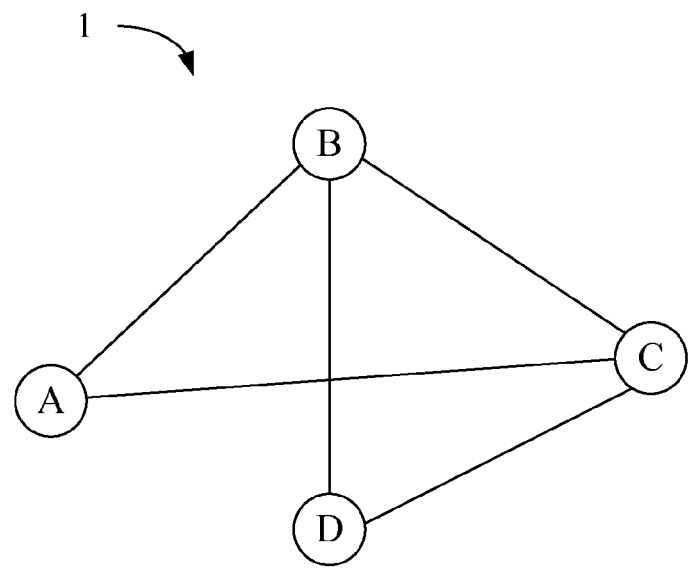
FIG. 1A is a schematic view depicting a topological structure of a heterogeneous network system 1 according to the first embodiment of the present invention.

The first embodiment of the present invention provides a heterogeneous network system 1 and a schematic view of a topological structure thereof is depicted in FIG. 1A. The heterogeneous network system 1 comprises four network apparatuses A, B, C, and D, each of the network apparatuses A, B, C, and D has at least one transceiving interface, and the network apparatuses A, B, C, and D are connected together (through the transceiving interfaces) as shown in FIG. 1A. In FIG. 1A, any two network apparatuses connected to each other by a straight line are neighboring network apparatuses to each other, e.g., the neighboring network apparatuses of the network apparatus A include the network apparatus B and the network apparatus C. The meaning of the neighboring network apparatuses will be described in detail later.

It shall be appreciated that the present invention does not limit the number of network apparatuses comprised in one heterogeneous network system as long as the number is finite. For example, the heterogeneous network system 1 may be a home network in some embodiments. Moreover, the present invention does not limit the topological structure of the plurality of network apparatuses comprised in one heterogeneous network system. For example, unlike the topology shown in FIG. 1A, the network apparatuses in some other embodiments must be fully connected. Additionally, each of the transceiving interfaces comprised in the network apparatuses A, B, C, and D has an interface type, wherein the interface types are not all the same. For example, the interface types may include Power Line Communication (PLC) interfaces, Wi-Fi interfaces, Ethernet interfaces, Multimedia over Coax Alliance (MoCA) interfaces, or other interfaces with the communication functionality.

In the present invention, one heterogeneous network system comprises a plurality of network apparatuses. From the perspective of one of the network apparatuses, the other network apparatuses comprised in the heterogeneous network system may be viewed as partner network apparatuses of the network apparatus. For example, from the perspective of the network apparatus A, the network apparatuses B, C, and D may be viewed as partner network apparatuses of the network apparatus A. As another example, from the perspective of the network apparatus B, the network apparatuses A, C, and D may be viewed as partner network apparatuses of the network apparatus B. Furthermore, for ease of description, the transceiving interfaces of the partner network apparatuses may be called partner transceiving interfaces.

Moreover, in the present invention, if a network apparatus can directly measure the transmission parameter between the network apparatus itself and another network apparatus, then the another network apparatus is the neighboring network apparatus thereof. For example, the transceiving interface of the network apparatus A can directly measure the transmission parameter between the network apparatus A itself and the network apparatus B, so the network apparatus B is the neighboring network apparatus of the network apparatus A.

In the present invention, each of the network apparatuses comprised in a heterogeneous network system utilizes the local transmission data (i.e., the transmission parameters that can be directly measured by a network apparatus, which are transmission parameters between the network apparatus and the neighboring network apparatuses) and the global transmission data (i.e., the transmission parameters that cannot be directly measured by a network apparatus, which are transmission parameters between other network apparatuses) to calculate path costs and then selects a path for subsequent transmission according to the calculated path costs.

In this embodiment, the network apparatuses A, B, C, and D operate similarly in terms of selecting a desired path for transmission. Therefore, only the operations performed by the network apparatus A in terms of selecting a desired path for transmission will be described in detail. How the network apparatuses B, C, and D operate to select a desired path for transmission shall be readily appreciated by those of ordinary skill in the art according to the descriptions of the network apparatus A.

Figure 1B:
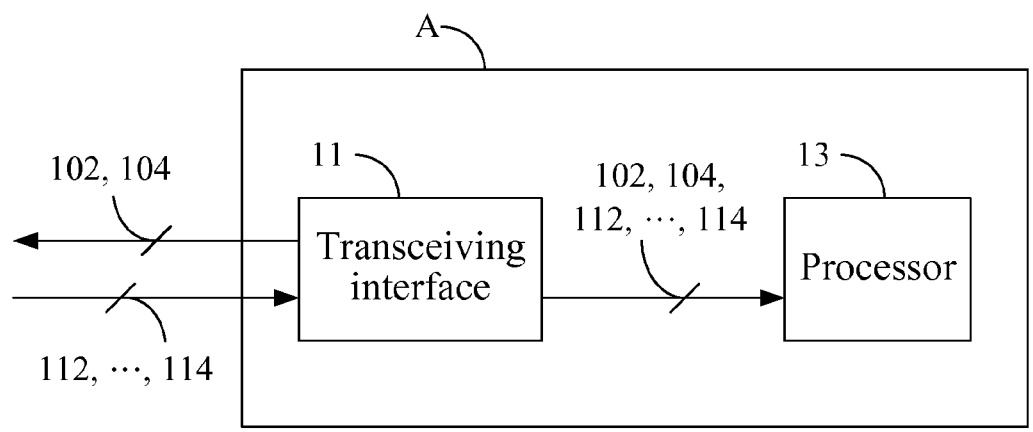
FIG. 1B is a schematic structural view of a network apparatus A according to the first embodiment.

FIG. 1B is a schematic view of the network apparatus A according to the first embodiment. The network apparatus A comprises a transceiving interface 11 and a processor 13, wherein they are electrically connected with each other. The transceiving interface 11 may be any interface capable of receiving and transmitting control signals and/or data wirely or wirelessly. The processor 13 may be any various processors, central processing units (CPUs), microprocessors, or other computing apparatuses known to those of ordinary skill in the art.

In this embodiment, each of the transceiving interfaces comprised in the network apparatuses A, B, C, and D measures a transmission parameter between the network apparatus itself and each of the neighboring network apparatuses (i.e., obtains the local transmission parameters). Each of the transmission parameters represents the transmission status, the transmission capacity, the transmission quality, and/or other parameters associated with the transmission between two network apparatuses neighboring each other. The network apparatus A is used as an example for the detailed descriptions. The transceiving interface 11 of the network apparatus A is directly connected (either in a wired way or wireless way) to the network apparatuses B and C. For each of the neighboring network apparatuses (i.e., the network apparatuses B and C) of the network apparatus A, the transceiving interface 11 individually measures a first transmission parameter (i.e. the first transmission parameter 102 and 104 for the network apparatuses B and C respectively) between the network apparatus A and the neighboring network apparatus. Each first transmission parameter 102 and 104 is associated with a transmission from the transceiving interface 11 to the corresponding neighboring network apparatus. The transceiving interface 11 measures the first transmission parameter 102 between the network apparatus A and the network apparatus B, wherein the first transmission parameter 102 is associated with a transmission from the transceiving interface 11 to the network apparatus B. The transceiving interface 11 measures the first transmission parameter 104 between the network apparatus A and the network apparatus C, wherein the first transmission parameter 104 is associated with a transmission from the transceiving interface 11 to the network apparatus C.

Each of the transceiving interfaces comprised in the network apparatuses A, B, C, and D will transmit the measured transmission parameters after it measures the transmission parameters between itself and each of the neighboring network apparatuses. Using the network apparatus A as an example, the transceiving interface 11 will transmit the first transmission parameters 102 and 104. It shall be appreciated that the present invention does not limit the way that the transceiving interfaces transmit the transmission parameters. For example, a transceiving interface may transmit the measured transmission parameters through broadcasting, multicasting, unicasting, or other manners.

Moreover, each of the network apparatuses A, B, C, and D comprised in the heterogeneous network system 1 receives the transmission parameters transmitted by other network apparatuses (i.e., obtains the global transmission parameters). Using the network apparatus A as an example, the transceiving interface 11 receives a plurality of second transmission parameters 112, . . . 114. Each of the second transmission parameters 112, . . . , 114 is associated with a transmission from one of the partner network apparatuses B, C, and D of the network apparatus A (called "a first network apparatus" for short) to a second network apparatus neighboring the first network apparatus (which may be one of the network apparatuses A, B, C, and D comprised in the heterogeneous network system 1). FIG. 1C depicts the plurality of second transmission parameters received by the network apparatus A. For example, if the second transmission parameter 112 is associated with a transmission from the network apparatus C to the network apparatus A, the network apparatus C is the first network apparatus and the network apparatus A is the second network apparatus with respect to the second transmission parameter 112. In another example, if the second transmission parameter 114 is associated with a transmission from the network apparatus C to the network apparatus B, the network apparatus C is the first network apparatus and the network apparatus B is the second network apparatus with respect to the second transmission parameter 114. It shall be appreciated that the present invention does not limit the way that the network apparatuses A, B, C, and D receive the transmission parameters transmitted by other network apparatuses. Furthermore, the present invention does not limit the number of hops through which the network apparatuses A, B, C, and D receive the transmission parameters transmitted by other network apparatuses.

It shall be appreciated that in some embodiments, each of the network apparatuses A, B, C, and D may measure the transmission parameters many times (e.g., periodically) and receive the transmission parameters many times (e.g., periodically) so that each of the network apparatuses A, B, C, and D can update the transmission parameters in real time to calculate the path cost more accurately.

Thereafter, each of the network apparatuses A, B, C, and D comprised in the heterogeneous network system 1 can enumerate a plurality of paths towards other network apparatuses and calculate a path cost for each of the paths so that a desired path for subsequent transmission may be selected according to the path costs. Here, the network apparatus A is again taken as an example for the detailed descriptions. The processor 13 of the network apparatus A enumerates a plurality of paths from the network apparatus A to one (or more) target network apparatus(es), where each target network apparatus is one of the partner network apparatuses of the network apparatus A (i.e., the network apparatuses B, C, and D), e.g., the network apparatus C. In some embodiments, the processor 13 may enumerate the aforesaid paths according to a hop count. For example, the processor 13 may enumerate the paths from the network apparatus A to the target network apparatus (e.g., the network apparatus C) according to a hop count value of 2 so that the hop counts involved in the enumerated paths are not greater than 2. In this example, there are three paths from the network apparatus A to the target network apparatus (e.g., the network apparatus C), including: (1) a path from the network apparatus A directly to the network apparatus C, (2) a path from the network apparatus A through the network apparatus B to the network apparatus C, and (3) a path from the network apparatus A through the network apparatus B and then through the network apparatus D to the network apparatus C.

Then, the processor 13 calculates a path cost for each of the paths from the network apparatus A to the target network apparatus (e.g., the network apparatus C) according to at least a portion of a combination of the first transmission parameters 102, 104 and the second transmission parameters 112, . . . , 114. In some embodiments, each of the paths comprises at least one link (i.e., the link between the network apparatuses that are neighboring each other), each of the links has a link transmission parameter, and each of the link transmission parameters is one of the first transmission parameters 102, 104 and the second transmission parameters 112, . . . , 114. The processor 13 calculates the path costs according to the link transmission parameters corresponding to the links comprised in each of the paths. Here, the aforesaid second path from the network apparatus A to the target network apparatus (e.g., the network apparatus C), the path from the network apparatus A through the network apparatus B to the network apparatus C, is taken as an example for detailed description. The second path comprises two links, including a link from the network apparatus A to the network apparatus B and a link from the network apparatus B to the network apparatus C. The processor 13 calculates the path costs of the paths according to the link transmission parameter between the network apparatus A and the network apparatus B as well as the link transmission parameter between the network apparatus B and the network apparatus C. After the path costs of the paths from the network apparatus A to the target network apparatus (e.g., the network apparatus C) are calculated according to the same principle, the processor 13 can decide a path for subsequent communication with the network apparatus C (e.g., select a path corresponding to the lowest path cost) accordingly.

In some embodiments, each of the first transmission parameters 102, 104 and the second transmission parameters 112, . . . , 114 may comprise a plurality of sub-parameters. For example, each of the first transmission parameters 102, 104 and the second transmission parameters 112, . . . , 114 may comprise a round trip time (RTT), an available bandwidth, and/or a Quality of Service (QoS) parameter. In other words, the RTT, the available bandwidth, and the QoS parameter may all be used as the sub-parameters. Moreover, in some embodiments, each of the aforesaid sub-parameters corresponds to a weight value, wherein a sum of the weight values corresponding to the sub-parameters comprised in the same transmission parameter (i.e., each of the first transmission parameters 102, 104 and the second transmission parameters 112, . . . , 114) is equal to a preset value. In these embodiments, the processor 13 calculates the path cost for each of the paths according to the at least a portion of a combination of the first transmission parameters 102, 104 and the second transmission parameters 112, . . . , 114 and the weight values.

Figures 1D, 1E:
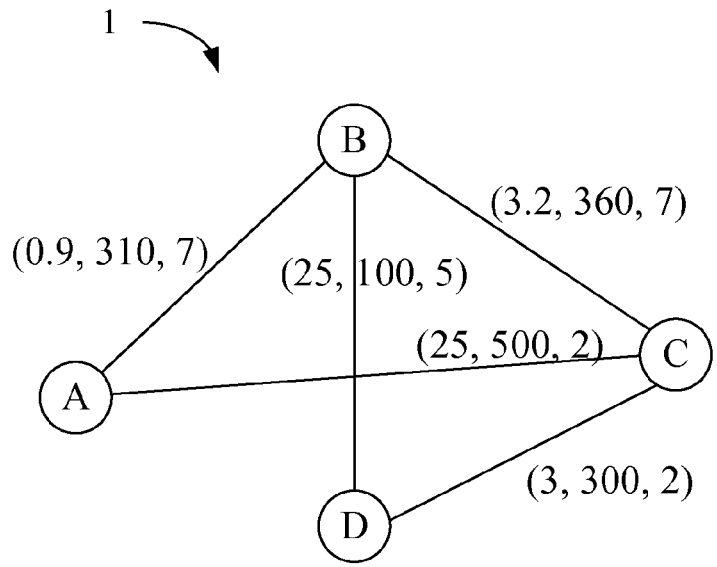
FIG. 1D depicts an exemplary example of the transmission parameters between network apparatuses A, B, C, and D.
FIG. 1E depicts corresponding relationships between original values of sub-parameters and normalized values of the sub-parameters.

For ease of understanding, a specific example is hereby detailed with reference to FIG. 1D, FIG. 1E, and FIG. 1F. In this specific example, each of the first transmission parameters 102, 104 and the second transmission parameters 112, . . . , 114 comprises three sub-parameters, namely, the RTT, the available bandwidth, and the QoS parameter. FIG. 1D depicts the values of the three sub-parameters comprised in each of the transmission parameters. The first value in each parentheses represents the RTT and the unit thereof is ms, the second value in each parentheses represents the available bandwidth and the unit thereof is Mbps, and the third value in each parentheses represents the code of the available QoS parameter (e.g., the code of the QoS specified in the IEEE 802.1Q standard, wherein smaller value indicates poorer quality of service). In this specific example, the transmission parameters from one network apparatus to another network apparatus are the same as the transmission parameters from the another network apparatus to the one network apparatus (e.g., the transmission parameters from the network apparatus A to the network apparatus B are the same as the transmission parameters from the network apparatus B to the network apparatus A). However, it shall be noted that the transmission parameters from one network apparatus to another network apparatus may be different from the transmission parameters from the another network apparatus to the one network apparatus in some embodiments.

In some embodiments, the processor 13 may normalize the sub-parameters before using them to calculate the path costs in order achieve a better and more accurate effect. FIG. 1E depicts the correspondence relationships between original values of the sub-parameters and the normalized values of the sub-parameters. When RRT is used as one sub-parameter, a longer RTT causes a higher cost. Therefore, a longer RTT will correspond to a greater normalized value. When the available bandwidth is used as one sub-parameter, a smaller bandwidth causes a higher cost. Hence, a smaller bandwidth corresponds to a greater normalized value. When the QoS parameter is used as a sub-parameter, a smaller index of the QoS parameter represents a poorer quality of service according to the IEEE 802.1Q standard. Hence, a smaller index of the QoS parameter corresponds to a greater normalized. Here, the table depicted in FIG. 1E is taken as an example for the concrete descriptions. If the RTT is 0.9 ms, the normalized value is 1. If the available bandwidth is 310 Mbps, the normalized value is 6. If the index of the QoS parameter is 7, the normalized value is 1. In this specific example, each of the RTT, the available bandwidth, and the QoS parameter comprised in the same transmission parameter corresponds to a weight value, wherein a sum of the weight values is equal to a preset value. For example, the weight values corresponding to the RTT, the available bandwidth, and the QoS parameter are respectively 5, 4, and 1, and the sum of the weight values is 10.

FIG. 1F illustrates the path costs of the paths from the network apparatus A to the target network apparatus (e.g., the network apparatus C) that are calculated in the aforesaid way. FIG. 1F enumerates three paths from the network apparatus A to the network apparatus C, namely: (1) a path from the network apparatus A directly to the network apparatus C (called "the first path" hereinafter), (2) a path from the network apparatus A through the network apparatus B to the network apparatus C (called "the second path" hereinafter), and (3) a path from the network apparatus A through the network apparatus B and then through the network apparatus D to the network apparatus C (called "the third path" hereinafter). The path cost of the first path is 37 (i.e., 5×3+4×4+1×6=37). The second path involves two links, namely, a first link from the network apparatus A to the network apparatus B and a second link from the network apparatus B to the network apparatus C. The RTT used in the second path is the sum of the RTT corresponding to the first link and the RTT corresponding to the second link (i.e., 0.9 ms+3.2 ms=4.1 ms). The available bandwidth used in the second path is the smaller one of the available bandwidth corresponding to the first link and the available bandwidth corresponding to the second link (i.e., min(310, 360)). The QoS parameter used in the second path is the smaller one of the QoS parameter corresponding to the first link and the QoS parameter corresponding to the second link (i.e., min(7, 7)). After the RTT, the available bandwidth, and the QoS parameter used in the second path are determined, they are individually normalized to calculate the path cost. The calculated path cost is 30 (i.e., 5×1+4×6+1×1=30). Based on the same principle, the path cost of the third path is 53 (i.e., 5×3+4×8+1×6=53). Since the second path has the lowest path cost, the processor 13 may select the second path (i.e., the path from the network apparatus A through the network apparatus B to the network apparatus C) as the transmission path from the network apparatus A to the network apparatus C.

As mentioned earlier, the network apparatus A may also calculate the path costs for the paths from itself to other target network apparatuses (e.g., the network apparatuses B and D) and then select the transmission path accordingly. Similarly, other network apparatuses may calculate the path costs through the aforesaid operations and then select the desired path for subsequent transmission accordingly. The details are not repeated herein.

It is noted that the network apparatuses A, B, C, and D comprised in the heterogeneous network system 1 may update the transmission parameters timely to make the calculated path costs more accurate. For example, each of the network apparatuses A, B, C, and D may periodically measure the transmission parameters between itself and the neighboring network apparatuses, transmit the measured transmission parameters periodically, and receive the transmission parameters transmitted by other network apparatuses periodically. As another example, the transmission parameters may be updated when a new network apparatus joins the heterogeneous network system 1 or when any of the network apparatuses leaves the heterogeneous network system 1. Furthermore, if the network apparatuses A, B, C, and D use the RTT as the sub-parameters, the RTT may be a value obtained by averaging RTTs acquired at different time points to make the calculated path cost more accurate. Similarly, if the network apparatuses A, B, C, and D use the available bandwidth as the sub-parameters, the available bandwidth may be a value obtained by averaging available bandwidths acquired at different time points to make the calculated path cost more accurate.

It shall be further appreciated that if any one (or more) of the network apparatuses A, B, C, and D comprised in the heterogeneous network system 1 comprises a plurality of transceiving interfaces, the path costs of different paths formed by the different transceiving interfaces may also be calculated in the aforesaid way and a desired path can then be selected for subsequent transmission accordingly.

According to the above descriptions, each of the network apparatuses A, B, C, and D comprised in the heterogeneous network system 1 measures a transmission parameter between itself and each of the neighboring network apparatuses, transmits the measured transmission parameters, and receives the transmission parameters transmitted by other network apparatuses. Accordingly, each of the network apparatuses A, B, C, and D can obtain not only local transmission data (i.e., the transmission parameters between itself and the neighboring network apparatuses) but also global transmission data (i.e., the transmission parameters between other network apparatuses). Since each of the network apparatuses A, B, C, and D can calculate the path cost for each of the paths according to the local transmission data and the global transmission data, accurate path costs can be calculated and, hence, the most appropriate transmission path can be selected.

Moreover, the transmission parameters used in this embodiment may comprise a plurality of sub-parameters (e.g., the RTT, the available bandwidth, and the QoS parameter), wherein each of the sub-parameters may correspond to a weight value in calculation of the path cost. Therefore, applications running in the heterogeneous network system 1, users, or operators of the heterogeneous network system 1 may select desired sub-parameters and adjust the weight values thereof depending on the status of the heterogeneous network system 1 or depending on their preferences to achieve a higher network utilization ratio.

Figure 2A:
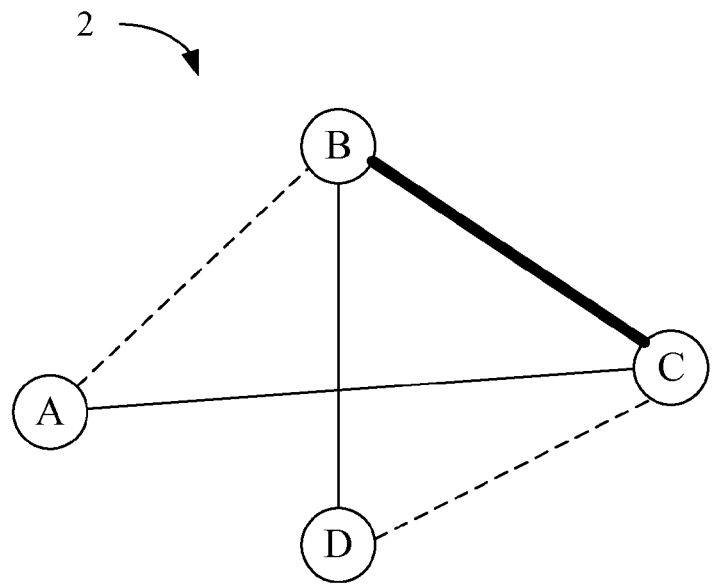
FIG. 2A is a schematic view depicting a topological structure of a heterogeneous network system 2 according to the second embodiment of the present invention.

A second embodiment of the present invention provides a heterogeneous network system 2, wherein a schematic view of a topological structure thereof is depicted in FIG. 2A. The heterogeneous network system 2 also comprises network apparatuses A, B, C, and D; however, each of the network apparatuses A, B, C, and D comprises a plurality of transceiving interfaces and the interface types of the transceiving interfaces comprised in the same network apparatus are different. In FIG. 2A, two network apparatuses connected by a straight line (including solid lines and broken lines having different thicknesses) are neighboring network apparatuses of each other. In addition, different types of the straight lines represent different interface types of transceiving interfaces.

The second embodiment differs from the first embodiment in that each of the network apparatuses A, B, C, and D may comprise a plurality of transceiving interfaces and the interface types of the transceiving interfaces comprised in the same network apparatus are different. With these differences, the two embodiments measure, receive, and transmit the transmission parameters differently. The two embodiments function similarly when enumerating the paths and calculating path costs. Furthermore, all of the network apparatuses A, B, C, and D operate similarly in this embodiment. Therefore, the differences between the second embodiment and the first embodiment will be detailed only from the viewpoint of the network apparatus A.

Figure 2B:
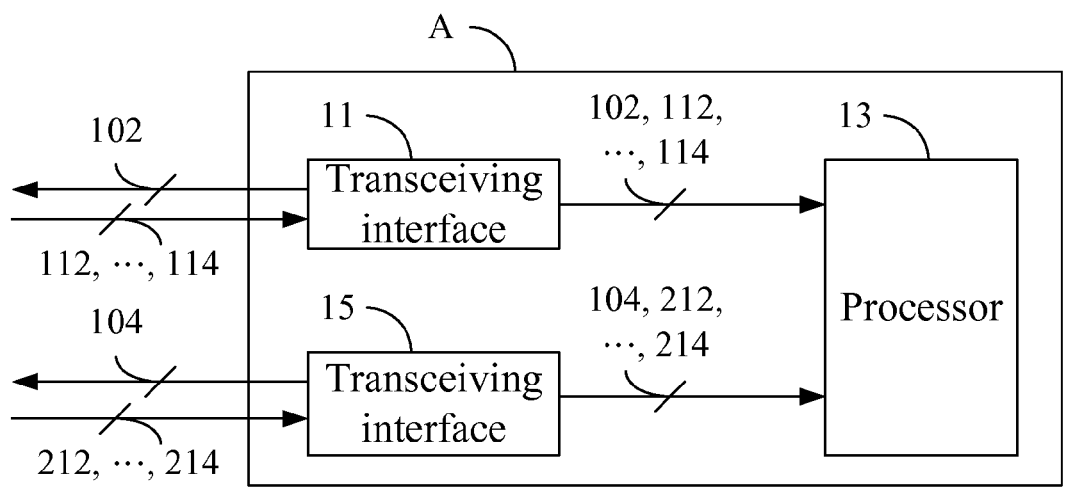
FIG. 2B is a schematic structural view of the network apparatus A according to the second embodiment.

FIG. 2B is a schematic structural view of the network apparatus A according to the second embodiment. The network apparatus A comprises two transceiving interfaces 11, 15 and a processor 13, wherein the transceiving interfaces 11, 15 are electrically connected to the processor 13. The interface type of the transceiving interface 11 is different from that of the transceiving interface 15. For example, the transceiving interface 11 is a Wi-Fi interface, while the transceiving interface 15 is an Ethernet interface. The network apparatus A is connected to the network apparatus B via the transceiving interface 11 and is connected to the network apparatus C via the transceiving interface 15.

In this embodiment, the network apparatus A also obtains local transmission data and global transmission data, calculates path costs according to the transmission data, and then select a desired path for subsequent transmission.

Each of the transceiving interface 11 and the transceiving interface 15 comprised in the network apparatuses A measures a transmission parameter between itself and each of the neighboring network apparatuses (i.e., obtains the local transmission data). Specifically, since the network apparatus A is connected to the network apparatus B via the transceiving interface 11, the transceiving interface 11 measures the first transmission parameter 102 associated with transmission from the transceiving interface 11 to the network apparatus B. Likewise, since the network apparatus A is connected to the network apparatus C via the transceiving interface 15, the transceiving interface 15 measures the first transmission parameter 104 associated with transmission from the transceiving interface 15 to the network apparatus C. Each of the transceiving interfaces comprised in the network apparatuses A, B, C, and D transmits the measured transmission parameters after it measures the transmission parameters between itself and the neighboring network apparatuses. Using the network apparatus A as an example, the transceiving interface 11 transmits the first transmission parameter 102, while the transceiving interface 15 transmits the first transmission parameter 104.

Additionally, each of the transceiving interfaces comprised in the network apparatuses A, B, C, and D receives the transmission parameters transmitted by the transceiving interfaces of other network apparatuses (i.e., obtains the global transmission data). Using the apparatus A as an example, the transceiving interface 11 receives a plurality of second transmission parameters 112, . . . 114. Each of the second transmission parameters 112, . . . , 114 is associated with transmission from a first network apparatus to a second network apparatus neighboring the first network apparatus. Each of the first network apparatuses is one of the partner network apparatuses of the network apparatus A (i.e., the network apparatuses B, C, and D), while each of the second network apparatuses is one of the network apparatuses A, B, C, and D. Similarly, the transceiving interface 15 receives a plurality of second transmission parameters 212, . . . , 214. Each of the second transmission parameters 212, . . . , 214 is associated with transmission from a first network apparatus to a second network apparatus neighboring the first network apparatus. Each of the first network apparatuses is one of the partner network apparatuses of the network apparatus A (i.e., the network apparatuses B, C, and D), while each of the second network apparatuses is one of the network apparatuses A, B, C, and D.

Thereafter, each of the network apparatuses A, B, C, and D comprised in the heterogeneous network system 2 can enumerate a plurality of paths from itself to other network apparatuses, calculate a path cost for each of the paths, and select a desired path for subsequent transmission according to the path costs. The way that the network apparatuses A, B, C, and D comprised in the heterogeneous network system 2 enumerate the paths and calculate the path costs is the same as that of the first embodiment; hence, the details are not repeated herein.

According to the above descriptions, when the interface types of the transceiving interfaces involved in the heterogeneous network system 2 are relatively diversified (i.e., one, some, or all of the network apparatuses A, B, C, and D comprise(s) a plurality of transceiving interfaces and the interface types of the transceiving interfaces are different), any of the network apparatuses comprised in the heterogeneous network system 2 will also calculate the path cost for each of the paths according to the local transmission data and the global transmission data. Thereby, accurate path costs can be calculated and the most appropriate transmission path can be selected.

Figure 3:
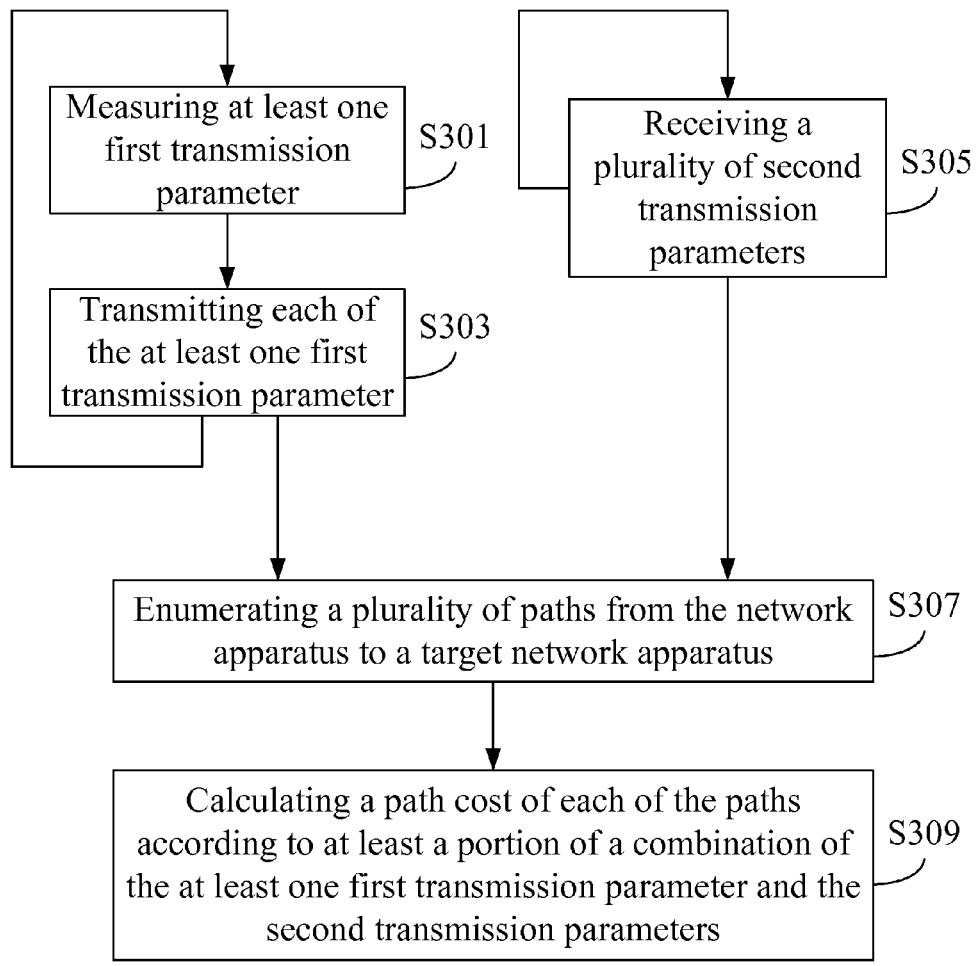
FIG. 3 is a flowchart diagram of a rendezvous path selection method according to the third embodiment of the present invention.

The third embodiment of the present invention provides a rendezvous path selection method and a flowchart diagram of which is depicted in FIG. 3. The rendezvous path selection method is used for a network apparatus (e.g., any of the network apparatuses A, B, C, and D comprised in the heterogeneous network system 1 of the first embodiment and any of the network apparatuses A, B, C, and D comprised in the heterogeneous network system 2 of the second embodiment). A heterogeneous network system comprises the network apparatus and a plurality of partner network apparatuses, wherein the network apparatus is directly connected to at least one neighboring network apparatus. Each of the at least one neighboring network apparatus is one of the partner network apparatuses. Each of the network apparatus and the partner network apparatuses comprises at least one transceiving interface, wherein each of the transceiving interfaces has an interface type and the interface types are not all the same.

In the rendezvous path selection method, step S301 is firstly executed to measure at least one first transmission parameter by the network apparatus. Each of the at least one first transmission parameter is associated with transmission from one of the at least one transceiving interface of the network apparatus to one of the at least one neighboring network apparatus. Through step S301, local transmission parameters are obtained by the network apparatus. Next, step S303 is executed to transmit each of the at least one first transmission parameter by the network apparatus. In this embodiment, step S301 and step S303 are repeatedly (e.g., periodically) executed so that each of the network apparatuses can update the transmission parameters timely to make the path costs subsequently calculated more accurate. However, it shall be appreciated that the present invention does not limit the number of times for executing steps S301 and S303 as long as step S301 is executed at least once. Moreover, it is noted that the step S303 may be omitted in other embodiments if the partner network apparatuses can calculate the path costs without having to use the at least one first transmission parameter.

The rendezvous path selection method also executes step S305 for receiving a plurality of second transmission parameters by the network apparatus. Each of the second transmission parameters is associated with transmission from a first network apparatus to a second network apparatus neighboring the first network apparatus. Each of the first network apparatuses is one of the partner network apparatuses, while each of the second network apparatuses is one of the partner network apparatuses and the network apparatus. Through step S305, global transmission parameters are obtained by the network apparatus. In this embodiment, the step S305 is repeatedly (e.g., periodically) executed so that each of the network apparatuses can update the transmission parameters timely to make the path costs subsequently calculated more accurate. However, it shall be appreciated that the present invention does not limit the number of times for executing step S305 as long as step S305 is executed at least once.

Step S307 is executed to enumerate a plurality of paths towards a target network apparatus by the network apparatus, wherein the target network apparatus is one of the partner network apparatuses. It shall be appreciated that the paths may be determined according to a hop count in the step S307 in some embodiments. For example, the paths from the network apparatus to the target network apparatus may be enumerated in the step S307 according to a hop count value of 2 so that the hop counts involved in the enumerated paths are not greater than 2.

Thereafter, step S309 is executed to calculate a path cost of each of the paths according to at least a portion of a combination of the at least one first transmission parameter and the second transmission parameters. In some embodiments, each of the paths comprises at least one link, each of the links has a link transmission parameter, and each of the link transmission parameters is one of the at least one first transmission parameter and the second transmission parameters. In these embodiments, each of the path costs is calculated in step S309 according to the at least one link transmission parameter corresponding to the at least one link comprised in each of the paths.

Moreover, in some embodiments, each of the aforesaid at least one first transmission parameter and the second transmission parameters comprises a plurality of sub-parameters. For example, each of the sub-parameters may be an RTT, an available bandwidth, or a QoS parameter. In some embodiments, each of the sub-parameters may correspond to a weight value, wherein a sum of the weight values corresponding to the sub-parameters comprised in each of the at least one first transmission parameter and the second transmission parameters is equal to a preset value. In these embodiments, the path cost of each of the paths may be calculated in step S309 according to the at least a portion of the at least one first transmission parameter and the second transmission parameters and the weight values.

Afterwards, the rendezvous path selection method can determine a transmission path from the network apparatus to the target network apparatus (e.g., a path corresponding to the lowest path cost is selected) according to the path costs calculated in the step S309.

In addition to the aforesaid steps, the third embodiment can also execute all the operations and steps set forth in the first and the second embodiments, have the same functions, and deliver the same technical effects as the first and the second embodiments. How the third embodiment executes these operations and steps, have the same functions, and deliver the same technical effects as the first and the second embodiments will be readily appreciated by those of ordinary skill in the art based on the explanation of the first and the second embodiments. Therefore, the details are not repeated herein.

The rendezvous path selection method described in the third embodiment may be implemented by a computer program product comprising a plurality of codes. The computer program product may be a file capable of being transmitted in a network or may be stored in a non-transitory computer readable storage medium. For the computer program product, when codes comprised therein are loaded into a network apparatus (e.g., any of the network apparatuses A, B, C, D comprised in the heterogeneous network system 1 of the first embodiment and any of the network apparatuses A, B, C, D comprised in the heterogeneous network system 2 of the second embodiment), the rendezvous path selection method of the third embodiment is executed by the computer program. The non-transitory computer readable storage medium may be an electronic product, e.g., a read only memory (ROM), a flash memory, a floppy disk, a hard disk, a compact disk (CD), a mobile disk, a magnetic tape, a database accessible to networks, or any other storage media with the same function and well known to those of ordinary skill in the art.

It shall be appreciated that in the specification of the present invention, the terms "first" and "second" used in the first transmission parameter and the second transmission parameter are only intended to distinguish these transmission parameters from each other. The terms "first" and "second" used in the first network apparatus and the second network apparatus are only intended to distinguish the network apparatuses from each other.

As can be known from the above descriptions of the embodiments, with the technology provided by the present invention, each of the network apparatuses comprised in the heterogeneous network system measures a transmission parameter between the network apparatus itself and each of the network apparatuses neighboring the network apparatus, transmits the measured transmission parameters, and receives the transmission parameters transmitted by other network apparatuses. Thus, each of the network apparatuses can obtain not only local transmission data (i.e., the transmission parameters between the network apparatus and the neighboring network apparatuses) but also global transmission data (i.e., the transmission parameters between other network apparatuses). Each of the network apparatuses can calculate a path cost for each of the paths according to the local transmission data and the global transmission data; hence, accurate path costs can be calculated and the most appropriate transmission path can be selected. Moreover, the transmission parameters used in the present invention may comprise a plurality of sub-parameters, wherein each of the sub-parameters may correspond to a weight value in calculation of the path costs. Thereby, a higher network utilization ratio can be achieved by selecting desired sub-parameters and adjusting the weight values corresponding to the sub-parameters.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network apparatus for use in a heterogeneous network system, the heterogeneous network system comprising the network apparatus and a plurality of partner network apparatuses, the network apparatus comprising:
at least one transceiving interface, wherein each of the at least one transceiving interface has an interface type, is directly connected to at least one neighboring network apparatus, measures at least one first transmission parameter, and receives a plurality of second transmission parameters, wherein each of the at least one neighboring network apparatus is one of the partner network apparatuses, each of the at least one first transmission parameter is associated with transmission from one of the at least one transceiving interface to one of the at least one neighboring network apparatus, each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus; and
a processor, being electrically connected to each of the at least one transceiving interface and configured to enumerate a plurality of paths from the network apparatus to a target network apparatus and calculate a path cost for each of the paths according to at least one link transmission parameter, each of the at least one link transmission parameter is one of the at least one first transmission parameter and the second transmission parameters, wherein the target network apparatus is one of the partner network apparatuses;
wherein each of the partner network apparatuses comprises at least one partner transceiving interface and each of the partner transceiving interfaces has an interface type, and
wherein the at least one interface types of the at least one transceiving interface of the network apparatus and the interface types of the partner transceiving interfaces are not all the same,
wherein each of the at least one first transmission parameter and the second transmission parameters comprises a plurality of sub-parameters, each of the sub-parameters corresponds to a weight value, and the path cost for each of the paths is calculated according to the weight values and the at least one link transmission parameters.

2. The network apparatus of claim 1, wherein each of the at least one transceiving interface further transmits the corresponding at least one first transmission parameter to at least one of the partner network apparatuses.

3. The network apparatus of claim 1, wherein a sum of the weight values corresponding to the sub-parameters comprised in each of the at least one first transmission parameter and the second transmission parameters is equal to a preset value.

4. The network apparatus of claim 1, wherein each of the at least one first transmission parameter comprises one of a round trip time, an available bandwidth, a Quality of Service (QoS) parameter, and a combination thereof, and each of the second transmission parameters comprises one of a round trip time, an available bandwidth, a QoS parameter, and a combination thereof.

5. The network apparatus of claim 1, wherein each of the paths comprises at least one link, each of the links has one of the link transmission parameters, and each of the path costs is calculated according to the at least one link transmission parameter corresponding to the at least one link comprised in each of the paths.

6. A rendezvous path selection method for a network apparatus, a heterogeneous network system comprising the network apparatus and a plurality of partner network apparatuses, the network apparatus comprising at least one transceiving interface, each of the at least one transceiving interface being directly connected to at least one neighboring network apparatus, each of the at least one neighboring network apparatus being one of the partner network apparatuses, the rendezvous path selection method comprising the following steps of:
(a) measuring at least one first transmission parameter, wherein each of the at least one first transmission parameter is associated with transmission from one of the at least one transceiving interface to one of the at least one neighboring network apparatus;
(b) receiving a plurality of second transmission parameters, wherein each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus; and
(c) enumerating a plurality of paths from the network apparatus to a target network apparatus, wherein the target network apparatus is one of the partner network apparatuses; and
(d) calculating a path cost for each of the paths according to at least one link transmission parameter, wherein each of the at least one link transmission parameter is one of the at least one first transmission parameter and the second transmission parameters,
wherein each of the partner network apparatuses comprises at least one transceiving interface and each of the transceiving interfaces has an interface type,
wherein the at least one interface types of the at least one transceiving interface of the network apparatus and the interface types of the partner transceiving interfaces are not all the same,
wherein each of the at least one first transmission parameter and the second transmission parameters comprises a plurality of sub-parameters, each of the sub-parameters corresponds to a weight value, and the path cost of each of the paths is calculated according to the weight values and the at least one link transmission parameters in the step (d).

7. The rendezvous path selection method of claim 6, further comprising transmitting each of the at least one first transmission parameter to at least one of the partner network apparatuses.

8. The rendezvous path selection method of claim 6, wherein a sum of the weight values corresponding to the sub-parameters comprised in each of the at least one first transmission parameter and the second transmission parameters is equal to a preset value.

9. The rendezvous path selection method of claim 6, wherein each of the at least one first transmission parameter comprises one of a round trip time, an available bandwidth, a QoS parameter, and a combination thereof, and each of the second transmission parameters comprises one of a round trip time, an available bandwidth, a QoS parameter, and a combination thereof.

10. The rendezvous path selection method of claim 6, wherein each of the paths comprises at least one link, each of the links has one of the link transmission parameters, and each of the path costs is calculated according to the at least one link transmission parameter corresponding to the at least one link comprised in each of the paths in the step (d).

11. A heterogeneous network system, comprising:
a plurality of partner network apparatuses; and
a network apparatus, comprising at least one transceiving interface, wherein each of the at least one transceiving interface is directly connected to at least one neighboring network apparatus, measures at least one first transmission parameter, and receives a plurality of second transmission parameters, each of the at least one neighboring network apparatus is one of the partner network apparatuses, each of the at least one first transmission parameter is associated with transmission from one of the at least one transceiving interface to one of the at least one neighboring network apparatus, each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus;
wherein the network apparatus is further configured to enumerate a plurality of paths from the network apparatus to a target network apparatus, and calculate a path cost for each of the paths according to at least one link transmission parameter, each of the at least one link transmission parameter is one of the at least one first transmission parameter and the second transmission parameters, wherein the target network apparatus is one of the partner network apparatuses;
wherein each of the partner network apparatuses comprises at least one transceiving interface and each of the transceiving interfaces has an interface type,
wherein the at least one interface types of the at least one transceiving interface of the network apparatus and the interface types of the partner transceiving interfaces are not all the same,
wherein each of the at least one first transmission parameter and the second transmission parameters comprises a plurality of sub-parameters, each of the sub-parameters corresponds to a weight value, and the path cost for each of the paths is calculated according to the weight values and the at least one link transmission parameters.

12. The heterogeneous network system of claim 11, wherein the network apparatus further transmits each of the at least one first transmission parameter to at least one of the partner network apparatuses.

13. The heterogeneous network system of claim 11, wherein a sum of the weight values corresponding to the sub-parameters comprised in each of the at least one first transmission parameter and the second transmission parameters is equal to a preset value.

14. The heterogeneous network system of claim 11, wherein each of the at least one first transmission parameter comprises one of a round trip time, an available bandwidth, a QoS parameter, and a combination thereof, and each of the second transmission parameters comprises one of a round trip time, an available bandwidth, a QoS parameter, and a combination thereof.

15. The heterogeneous network system of claim 11, wherein each of the paths comprises at least one link, each of the links has one of the link transmission parameters, and each of the path costs is calculated according to the at least one link transmission parameter corresponding to the at least one link comprised in each of the paths.

* * * * *